(12) United States Patent
Yun

(10) Patent No.: US 11,358,073 B2
(45) Date of Patent: Jun. 14, 2022

(54) WASTEWATER DISSOLVED-AIR FLOATATION APPARATUS COMBINED WITH PRECIPITATION TANK HAVING SLOPED PLATES

(71) Applicant: Jong Seok Yun, Incheon (KR)

(72) Inventor: Jong Seok Yun, Incheon (KR)

( * ) Notice: Subject to any disclaimer, the term of this patent is extended or adjusted under 35 U.S.C. 154(b) by 0 days.

(21) Appl. No.: 17/289,815

(22) PCT Filed: Apr. 23, 2020

(86) PCT No.: PCT/KR2020/005338
§ 371 (c)(1),
(2) Date: Apr. 29, 2021

(87) PCT Pub. No.: WO2020/246707
PCT Pub. Date: Dec. 10, 2020

(65) Prior Publication Data
US 2021/0394088 A1 Dec. 23, 2021

(30) Foreign Application Priority Data
Jun. 4, 2019 (KR) .................. 10-2019-0065725

(51) Int. Cl.
*C02F 1/24* (2006.01)
*B01D 21/24* (2006.01)
(Continued)

(52) U.S. Cl.
CPC ..... *B01D 21/2461* (2013.01); *B01D 21/0003* (2013.01); *B01D 21/0006* (2013.01);
(Continued)

(58) Field of Classification Search
CPC ............ B01D 21/0006; B01D 21/0045; B01D 21/0084; B01D 21/2433; B01D 21/2438; B01D 21/2461; C02F 1/24
(Continued)

(56) References Cited

U.S. PATENT DOCUMENTS

| 3,121,680 A | * | 2/1964 | Ciabattari | .......... B01D 21/2438 210/221.2 |
| 4,957,628 A | * | 9/1990 | Schulz | ............... B01D 21/0006 210/521 |

(Continued)

FOREIGN PATENT DOCUMENTS

| JP | 3767940 B2 | 4/2006 |
| KR | 10-1998-0072106 A | 10/1998 |

(Continued)

OTHER PUBLICATIONS

Machine translation of KR 10-1654508, Sep. 2016 (Year: 2016).*

*Primary Examiner* — Christopher Upton
(74) *Attorney, Agent, or Firm* — Novick, Kim & Lee, PLLC; Jae Youn Kim

(57) ABSTRACT

A wastewater dissolved-air floatation apparatus combined with a precipitation tank having sloped plates is proposed. The apparatus can reduce a transfer load according to the discharge of sludge, when the sludge is discharged through a discharge screw which is a discharge means, so as to enable sludge discharge efficiency to be maximized, has a cleaning means so as to enable components provided therein to be easily cleaned, maintained and managed through cleaning when the inside thereof is required to be cleaned, can control the discharge level of wastewater, which has been treated while sludge precipitation and suspended particle floatation are stably performed thereon inside a separation tank to which microbubbles are supplied, selectively blocks the supply of the microbubbles into the separation tank so as to use the separation tank as a precipitation tank.

2 Claims, 11 Drawing Sheets

(51) Int. Cl.
    *B01D 21/00*    (2006.01)
    *B01D 21/28*    (2006.01)
(52) U.S. Cl.
    CPC ..... *B01D 21/0021* (2013.01); *B01D 21/0045* (2013.01); *B01D 21/0075* (2013.01); *B01D 21/0084* (2013.01); *B01D 21/2438* (2013.01); *B01D 21/28* (2013.01); *C02F 1/24* (2013.01)
(58) Field of Classification Search
    USPC ..... 210/703, 802, 221.2, 521, 522, 523, 525
    See application file for complete search history.

(56)             References Cited

U.S. PATENT DOCUMENTS 7,485,223 B2 *   2/2009  Eijt .......................... C02F 1/24
                                                         210/522
    2012/0152850 A1 *  6/2012  Tsai .................. B01D 21/0045
                                                         210/703

FOREIGN PATENT DOCUMENTS

KR      10-0797196 B1    1/2008
    KR      10-0797197 B1    1/2008
    KR      10-0969933 B1    7/2010
    KR      10-1334950 B1   11/2013
    KR      10-1654508 B1    9/2016
    KR      10-1877200 B1    7/2018
    KR      10-2052855 B1   12/2019

* cited by examiner

WASTEWATER DISSOLVED-AIR FLOATATION APPARATUS COMBINED WITH PRECIPITATION TANK HAVING SLOPED PLATES

TECHNICAL FIELD

The present invention relates to an apparatus for floating sludge in wastewater combined with a precipitation tank including sloped plates, and more particularly, to an apparatus for floating sludge in wastewater combined with a precipitation tank including sloped plates, which is capable of maximizing the discharge efficiency of sludge by reducing a transfer load required to discharge sludge by virtue of a discharge screw serving as a discharge unit, of easily performing washing and management of internal components using a washing unit when it is required to wash the internal components, of enabling stable precipitation of sludge and stable floatation of floating substances in a precipitation and separation tank to which fine bubbles are supplied, of controlling the discharge level of treated wastewater, of maximizing the efficiency of precipitation by selectively blocking the supply of fine bubbles to the inside of the precipitation and separation tank to use the precipitation and separation tank as a separation tank and by guiding precipitation downwards in a vertical direction or in an inclined direction, and of maximizing the efficiency of insulation by improving the structure of a wall body of the precipitation and separation tank.

BACKGROUND ART

Generally, a conventional apparatus for treating wastewater through jetting and floatation is configured to supply fine bubbles to the inside of a separation tank to thus float floating substances together with the fine bubbles and to remove the floating substances, and is composed of a separation tank, which serves to store wastewater and has an introduction port for introduction of wastewater and a discharge port for discharge of treated wastewater, a supply unit disposed close to the introduction port so as to supply fine bubbles to the inside of the separation tank, a removal unit disposed above the separation tank so as to recover floating substances, and a discharge disposed at the lower portion of the separation tank so as to discharge precipitated sludge.

Accordingly, when fine bubbles are supplied to the inside of the separation tank using the supply unit, the fine bubbles adhere to agglomerated floating substances while floating in the wastewater, thereby causing the floating substances to float on the liquid level of the wastewater and to be removed using the removal unit. Meanwhile, sludge, which has a higher specific gravity and is thus precipitated on the bottom of the separation tank, is discharged through the discharge unit.

However, the conventional apparatus for treating wastewater through jetting and floatation has a problem in that not only floating substances but also sludge, having a higher specific gravity than wastewater, is temporarily suspended in wastewater due to the high flow rate of the wastewater while the fine bubbles are supplied to the inside of the separation tank.

Furthermore, because the removal unit is disposed so as to remove floating substances on the liquid surface of the wastewater using the flowing motion of the liquid surface, there is a problem in that it is not easy to remove the floating substances.

In addition, the conventional apparatus for treating wastewater through jetting and floatation has problems in that it is difficult to use the separation tank as a precipitation tank as well, and, particularly, it is difficult to selectively guide the precipitation of sludge in wastewater contained in the separation tank downwards in a vertical direction or in an inclined direction.

Furthermore, because the conventional apparatus for treating wastewater through jetting and floatation is constructed such that a discharge screw, which serves as the discharge unit, is provided as a simple screw, thereby causing concentrated discharge of sludge, there are problems in that the efficiency of sludge discharge is lowered and in that the force required to drive the discharge screw for sludge discharge is greatly increased, thus deteriorating the durability of the discharge unit.

In addition, because the conventional apparatus for treating wastewater through jetting and floatation must perform washing using an additional washing unit when the internal components are required to be washed, there is a problem in that it is not easy to perform management and repair through washing.

Accordingly, there is the need for research and development into an apparatus for floating sludge in wastewater combined with a precipitation tank including sloped plates, which is capable of stably inducing precipitation of sludge and floatation of floating substances while controlling the discharge level of treated wastewater, of maximizing the efficiency of precipitation by selectively blocking the supply of fine bubbles to the inside of the separation tank in order to use a separation tank as a precipitation tank and by guiding precipitation downwards in a vertical direction or in an inclined direction, of maximizing the efficiency of sludge discharge by reducing the transfer load required to discharge sludge through a discharge screw serving as a discharge unit, and of easily performing washing and management of internal components using an additional washing unit when the internal components are required to be washed.

RELATED ART DOCUMENTS

Patent Documents

[Patent Document 1]
Korean Patent Registration No. 797197, registered on Jan. 16, 2008
[Patent Document 2]
Korean Patent Registration No. 797196, registered on Jan. 16, 2008
[Patent Document 3] Korean Patent Registration No. 1334950, registered on Nov. 11, 2013

DISCLOSURE

Technical Problem

In order to overcome the above problems, an object of the present invention is to provide an apparatus for floating sludge in wastewater combined with a precipitation tank including sloped plates, which includes the discharge unit, which is embodied as a discharge screw having the transfer pressure control cuts, which are formed in the screw blade, which is wound around the shaft at regular intervals in a spiral direction, thereby making it possible to optimize the efficiency with which sludge is discharged, by reducing the transfer load required to discharge the sludge using the discharge screw.

Another object of the present invention is to provide an apparatus for floating sludge in wastewater combined with a precipitation tank including sloped plates, which is provided with a washing unit, thereby making it possible to easily wash and manage the sloped plate unit in the precipitation and separation tank when the sloped plate unit is required to be washed.

A further object of the present invention is to provide an apparatus for floating sludge in wastewater combined with a precipitation tank including sloped plates, in which a wall body of the precipitation and separation tank is improved so as to realize an insulating structure, thereby making it is possible to maximize the efficiency of insulation of the apparatus.

Yet a further object of the present invention is to provide an apparatus for floating sludge in wastewater combined with a precipitation tank including sloped plates, which is capable of selectively precipitating or floating sludge in the precipitation and separation tank to which fine bubbles are supplied while controlling the discharge level of wastewater from which the sludge is recovered through the precipitation or floatation, and in which a sloped plate unit is configured to be selectively rotatable so as to be inclined at a predetermined angle relative to the vertical position, thereby making it possible to selectively use the precipitation and separation tank only as a precipitation tank by blocking the supply of fine bubbles to the inside of the precipitation and separation tank and making it possible to maximize the efficiency of precipitation by guiding the sludge in the vertical direction or in the inclined direction.

Technical Solution

In order to accomplish the above objects, the present invention is constructed as follows.

The apparatus for floating sludge in wastewater combined with a precipitation tank including sloped plates according to the present invention, which is constructed to selectively precipitate or float sludge included in wastewater introduced thereinto to thus recover the sludge, includes a precipitation and separation tank including an introduction port and a discharge port such that the wastewater introduced into the apparatus through the introduction port and the wastewater, from which the precipitated or floating sludge is recovered, is discharged through the discharge port, a jetting and floating unit, which is disposed close to the introduction port so as to selectively jet fine bubbles into the precipitation and separation tank 100 and to selectively float the sludge included in the wastewater introduced into the precipitation and separation tank, a removal unit, which is disposed above the precipitation and separation tank 100 so as recover the sludge floated in the wastewater, a discharge unit embodied as a discharge screw, which is disposed at a lower portion of the precipitation and separation tank 100 and which is composed of a shaft, which is rotated by a motor and a reduction gear, and a screw blade spirally wound around the shaft in a longitudinal direction so as to discharge the precipitated sludge, a sloped plate unit, which is disposed in the precipitation and separation tank so as to stabilize the introduction of the wastewater through the introduction port and the flow of the wastewater using the fine bubbles supplied from the jetting and floating unit to thus selectively precipitate the sludge downwards, an elevation wall, which is disposed so as to isolate the discharge port from the removal unit and which is disposed in a housing so as to control the discharge level of the wastewater, from which the sludge is recovered, by controlling the height thereof, the housing being configured such that the wastewater, from which the lower precipitated sludge or upper floating sludge in the precipitation and separation tank is recovered, is introduced through a portion of a lower portion thereof and is then discharged through the discharge port formed in another portion thereof, and the screw blade of the discharge screw serving as the discharge unit having transfer pressure cuts formed therein in a direction in which the screw blade is spirally wound around the shaft in order to reduce the transfer load required to transfer the sludge precipitated in the lower portion of the precipitation and separation tank toward one side of the precipitation and separation tank in a longitudinal direction.

Preferably, the apparatus according to the present invention further includes a washing unit configured to pneumatically perform washing of an inside of the introduction port and upper and lower sides of the sloped plate unit.

Preferably, the washing unit includes an upper support pipe having a hollow pipe structure, which is disposed above the sloped plate unit in the precipitation and separation tank and has spray holes formed through a lower portion thereof at regular intervals, a lower support pipe having a hollow pipe structure, which is disposed under the sloped plate unit and which has spray holes formed through an upper portion thereof at regular intervals, an air compressor disposed outside of the introduction port of the precipitation and separation tank so as to generate compressed air, and a booster compressor, which is connected to the air compressor so as to boost a pressure of the compressed air to thus create compressed air having a boosted pressure and which selectively supplies the compressed air having the boosted pressure to at least one of the inside of the introduction port, the spray holes in the upper support pipe, and the spray holes in the lower support pipe.

Preferably, the booster compressor includes a cylindrical stator, which is made of synthetic rubber and has a spiral compression chamber formed therethrough, a rotor, which has a spiral protrusion formed on an outer surface thereof and is rotatably fitted into the spiral compression chamber in the cylindrical stator, and a cylindrical sleeve coupled on the outer surface of the cylindrical stator, wherein, when the rotator rotates, the booster compressor generates compressed air having a boosted pressure and supplies the compressed air to the inside of the introduction port and the upper and lower sides of the sloped plate unit through the spray holes in the upper support pipe and the spray holes in the lower support pipe.

Preferably, the sloped plate unit includes a plurality of sloped plates, which are arranged at the upper side of the inside of the precipitation and separation tank at regular intervals, a holding bar, which is in close contact with side portions of the sloped plates so as to hold the adjacent sloped plates to each other, a rotating shaft projecting from the center of the holding bar, and a control box, which is connected to the rotating shaft and performs control to rotate the rotating shaft to a predetermined angle to thus selectively rotate the sloped plates to the predetermined angle.

Preferably, each of the sloped plates is corrugated in a horizontal direction so as to have convex portions and concave portions, which are alternately and repeatedly arranged.

Preferably, the elevation wall includes a first wall body fixedly mounted on the inner bottom of the housing, a second wall body configured to be raised and lowered in the state of being in close contact with one surface of the first wall body, and a controller, connected to the second wall body so as to control the height of the elevation wall.

Preferably, the first wall body is provided with a bolt, which projects in one direction therefrom and which is engaged with a nut, and the second wall body is provided therein with a long hole so as to be raised and lowered in the state in which the bolt is disposed in the long hole.

Preferably, the controller includes a nut block mounted on one side of the upper portion of the first wall body, a bracket mounted on the upper portion of the housing, and a shaft bolt, which rotatably extends through the bracket and is engaged with the nut block, and a handle is coupled to the upper end of the shaft bolt, which projects upwards from the bracket.

Preferably, the jetting and floating unit includes a pump configured to suck and pump the wastewater in the precipitation and separation tank, an air compressor configured to supply air to the wastewater introduced into the pump, a mixer configured to mix the wastewater and the air supplied by the pump in a pipe in order to create fine bubbles, and a chamber configured to distribute the fine bubbles, created by the mixer, together with the wastewater into the precipitation and separation tank.

Preferably, the removal unit includes a conveyor positioned above the precipitation and separation tank, a scraper, which is coupled to the conveyor a regular intervals and is rotated in linkage with rotation of the conveyor while scraping the floating sludge, a guide panel configured to discharge the sludge, which is scraped by the scraper, to the outside of the precipitation and separation tank, and a floating sludge discharge port, which is formed at one end of the lower end of the guide panel so as to communicate with the outside such that the sludge guided along the guide panel 330 is discharged to the outside of the precipitation and separation tank.

Preferably, the wall body of the precipitation and separation tank is configured to have a multi-layered structure in which an insulation block is interposed between a pair of main plates so as to have an insulating structure.

Preferably, the insulation block is manufactured through a process composed of a material preparation operation of mixing 50 wt % bottom ash, 10 wt % fly ash, 5 wt % glass beads, 15 wt % clay ash, 10 wt % graphite ash, 5 wt % sodium silicate, and 5 wt % auxiliary additive to prepare an insulation material and preparing a zigzag-shaped reinforcing plate, a forming operation of disposing the reinforcing plate at the center of a mold, injecting the insulation material into the mold and pressing the insulation material including the reinforcing plate using a press to form a bar-shaped block, a drying operation of drying the formed block at 80-450° C. for 25 minutes while passing the formed block through a drying furnace, a baking operation of baking the dried block in a baking furnace at 900-1300° C. for 35 minutes, and a cooling operation of cooling the baked block in a nitrogen atmosphere for 10 minutes.

Preferably, in the material preparation operation of the process of manufacturing the insulation block, the 50 wt % bottom ash having a particle size of 0.3 mm-5 mm is mixed such that the particle size distribution of the bottom ash is 10 wt % of 4.7-5 mm, 40 wt % of 4.75-2.36 mm, 30 wt % of 2.36-1.18 mm, 10 wt % of 1.18-0.6 mm and 10 wt % of 0.6-0.3 mm, based on a total of 100 wt % of bottom ash.

Advantageous Effects

The effects of the apparatus for floating sludge in wastewater combined with a precipitation tank including sloped plates according to the present invention are as follows.

First, since the apparatus according to the present invention includes the discharge unit, which is embodied as the discharge screw having the transfer pressure control cuts, which are formed in the screw blade, which is wound around the shaft at regular intervals in a spiral direction, it is possible to optimize the efficiency with which sludge is discharged, by reducing the transfer load that is required to discharge the sludge by virtue of the discharge screw.

Second, since the apparatus is provided with the washing unit, it is possible to easily wash and manage the sloped plate unit in the precipitation and separation tank when the sloped plate unit is required to be washed.

Third, since the wall body of the precipitation and separation tank is improved so as to realize an insulating structure, it is possible to maximize the efficiency of insulation of the apparatus.

Fourth, it is possible to selectively precipitate or float sludge in the precipitation and separation tank to which fine bubbles are supplied while controlling the discharge level of wastewater from which the sludge is recovered through the precipitation or the floatation. In addition, since the sloped plate unit is configured to be selectively rotatable so as to be inclined at a predetermined angle relative to the vertical position, it is possible to selectively use the precipitation and separation tank only as a precipitation tank by blocking the supply of fine bubbles to the inside of the precipitation and separation tank, and it is possible to maximize the efficiency of precipitation by guiding the sludge in the vertical direction or in the inclined direction.

DESCRIPTION OF REFERENCE NUMERALS

Figure 1:
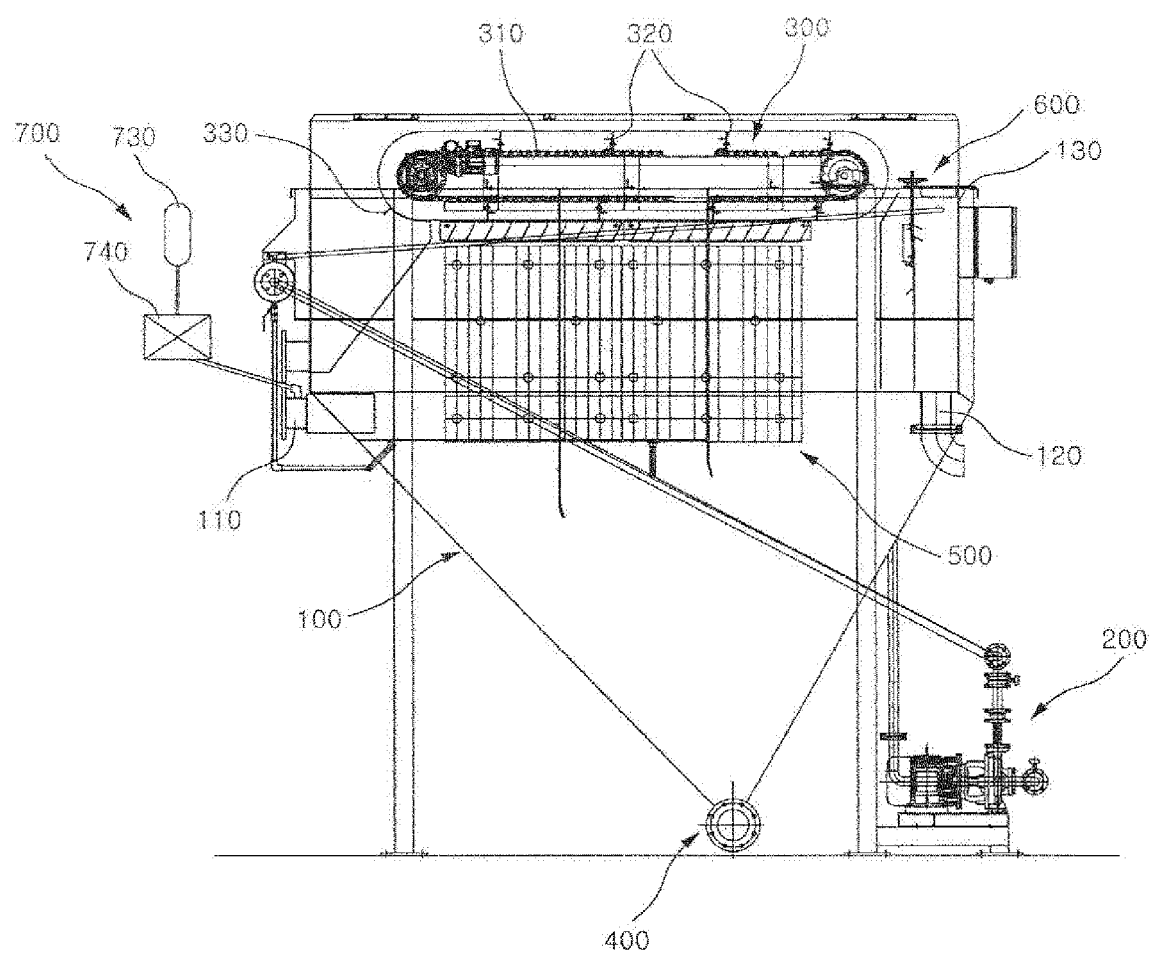
FIG. 1 is a front elevation view illustrating the apparatus for floating sludge in wastewater combined with a precipitation tank including sloped plates according to the present invention.

100: precipitation and separation tank
101: main plate
102: insulation block
110: introduction port
120: discharge port
130: housing
200: jetting and floating unit
210: pump
220: air compressor
240: chamber
300: removal unit
310: conveyor
320: scraper
330: guide panel
340: floating sludge discharge port
400: discharge unit
410: shaft
420: screw
421: transfer pressure control cut
500: sloped plate unit
510: sloped plate
520: holding bar
530: rotating shaft
550: control box
600: elevation wall
610: first wall body
611: bolt
620: second wall body
621: long hole
630: controller
631: nut block
632: bracket
633: shaft bolt
634: handle
700: washing unit
710: upper support pipe
711: spray hole
720: lower support pipe
721: spray hole
730: air compressor
740: booster compressor
741: stator
741a: compression chamber
742: rotor
742a: protrusion
743: cylindrical sleeve

BEST MODE

Hereinafter, an apparatus for floating sludge in wastewater combined with a precipitation tank including sloped plates according to a preferred embodiment of the present invention will be described in detail.

FIG. 1 is a front schematic view of the apparatus for floating sludge in wastewater combined with a precipitation tank including sloped plates according to the present invention.

Figure 2:
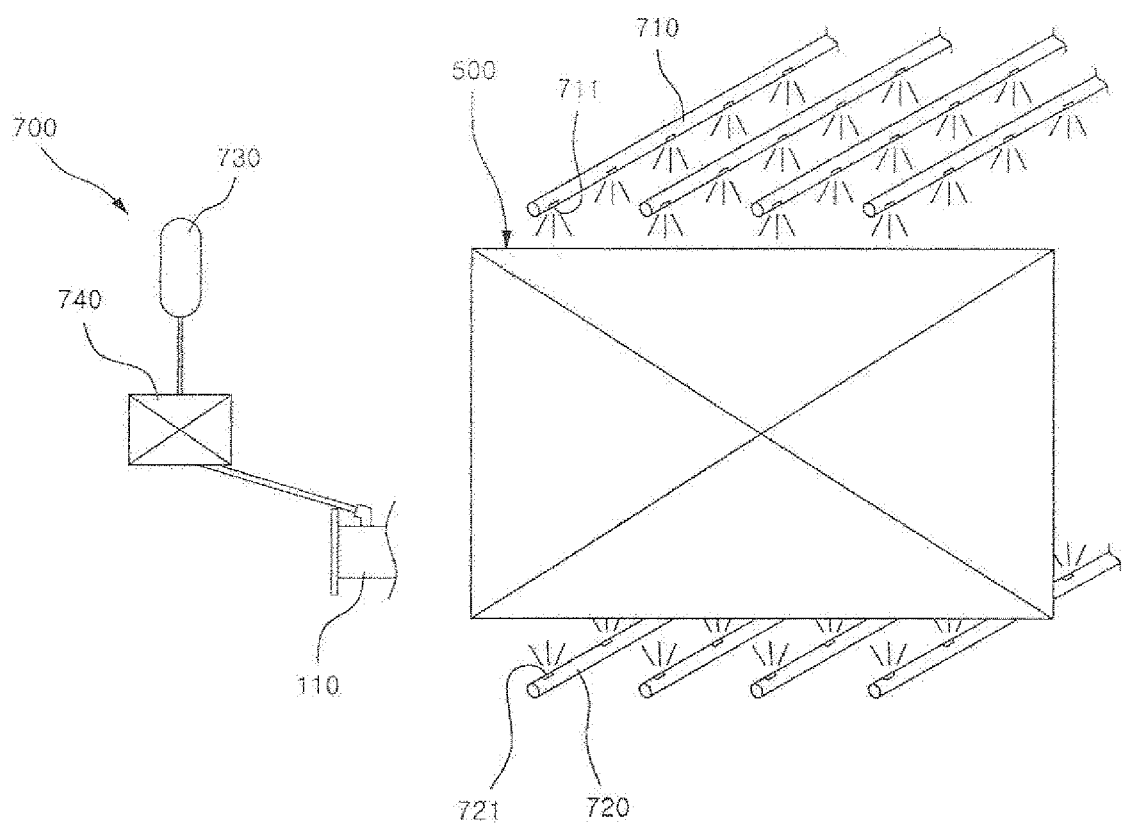
FIG. 2 is a schematic view illustrating the structure of a washing unit, which is a substantial part of the apparatus for floating sludge in wastewater combined with a precipitation tank including sloped plates according to the present invention.
Figure 3:
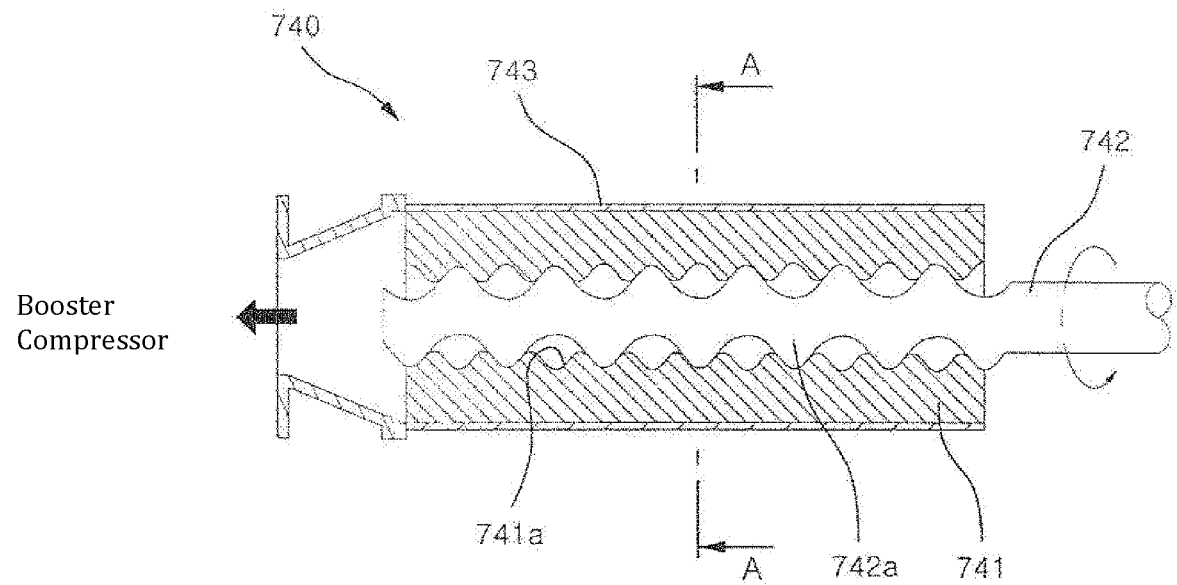
FIG. 3 is a cross-sectional view illustrating a booster compressor, which is a substantial part of the washing unit shown in FIG. 2.
Figure 4:
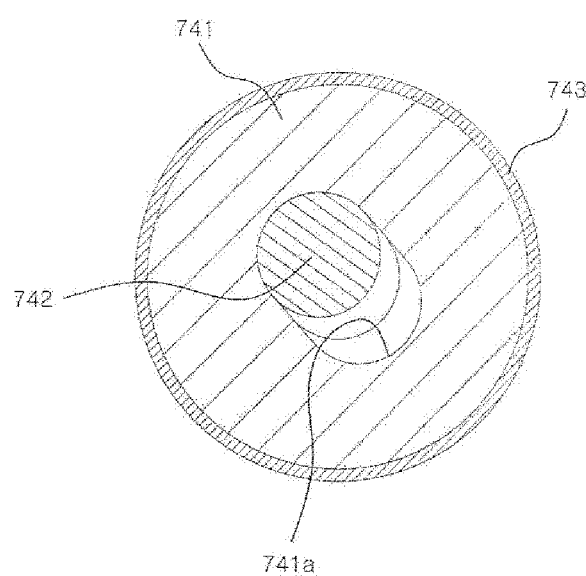
FIG. 4 is a cross-sectional view taken along line A-A in FIG. 3.

FIG. 2 is a schematic view illustrating the structure of a washing unit, which is a substantial part of the apparatus for floating sludge in wastewater combined with a precipitation tank including sloped plates according to the present invention. FIG. 3 is a cross-sectional view illustrating a booster compressor, which is a substantial part of the washing unit shown in FIG. 2. FIG. 4 is a cross-sectional view taken along line A-A in FIG. 3.

Figure 5:
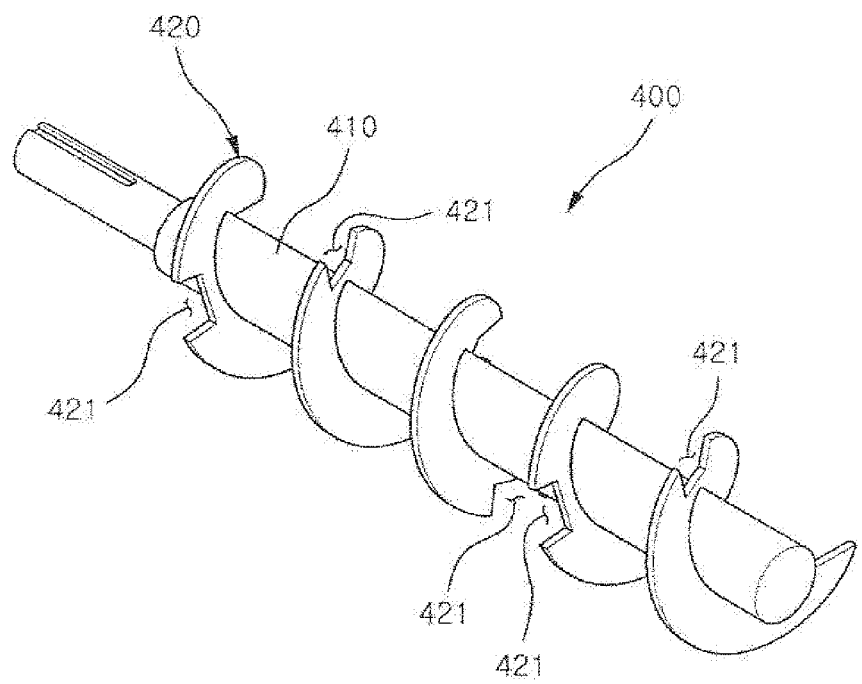
FIG. 5 is a perspective view illustrating a discharge screw, which is a substantial part of the apparatus for floating sludge in wastewater combined with a precipitation tank including sloped plates according to the present invention.

FIG. 5 is a perspective view illustrating a discharge screw, which is a substantial part of the apparatus for floating sludge in wastewater combined with a precipitation tank including sloped plates according to the present invention.

Figure 6:
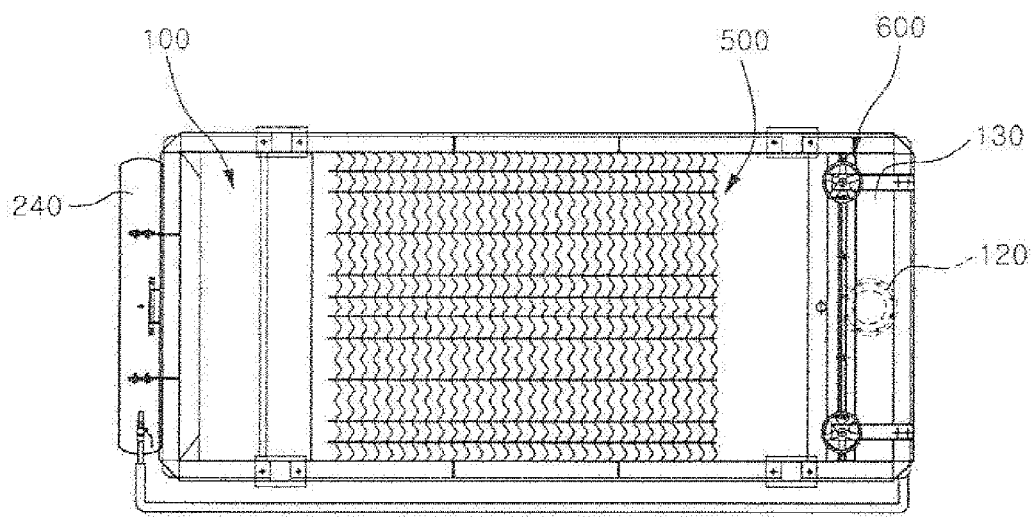
FIG. 6 is a plan view illustrating the apparatus for floating sludge in wastewater combined with a precipitation tank including sloped plates according to the present invention.
Figure 7:
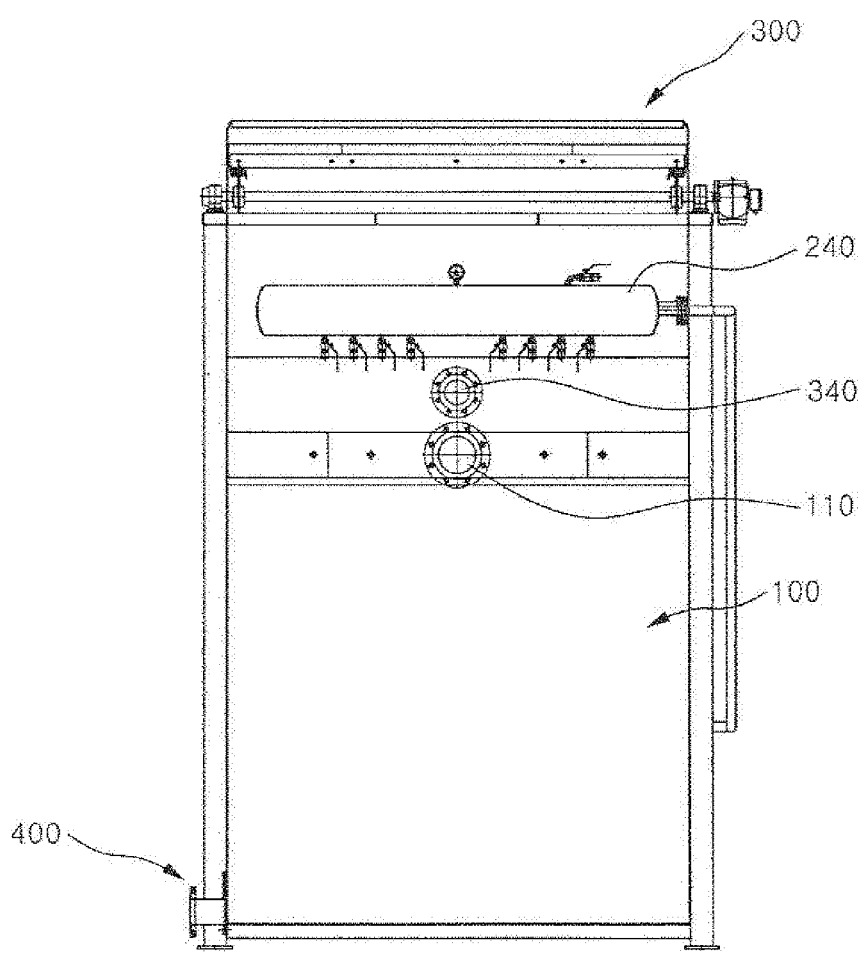
FIGS. 7 and 8 are side views illustrating the apparatus for floating sludge in wastewater combined with a precipitation tank including sloped plates according to the present invention.
Figure 8:
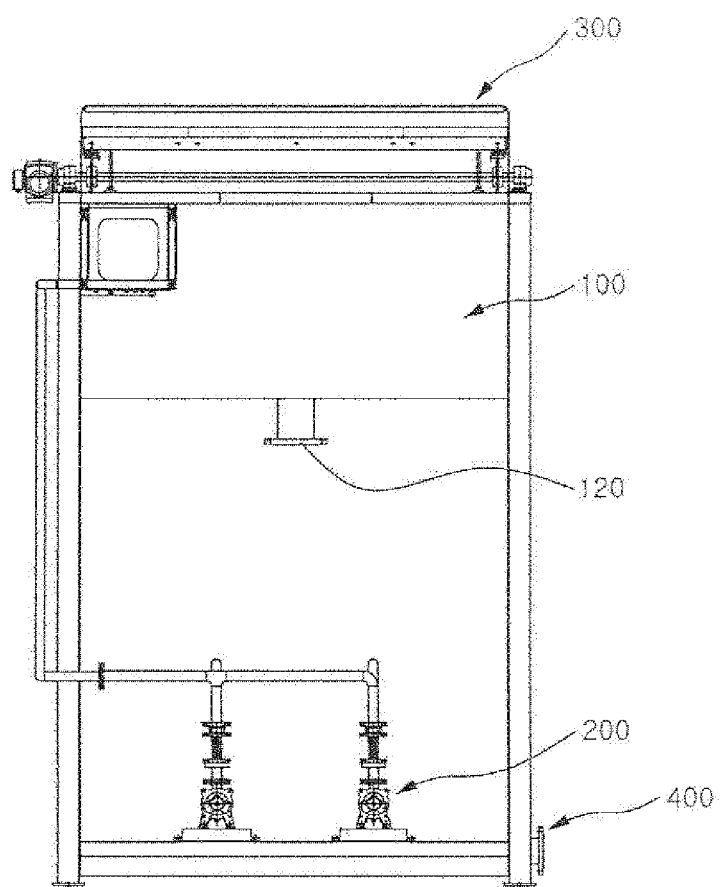

FIG. 6 is a plan view illustrating the apparatus for floating sludge in wastewater combined with a precipitation tank including sloped plates according to the present invention. FIGS. 7 and 8 are side views illustrating the apparatus for floating sludge in wastewater combined with a precipitation tank including sloped plates according to the present invention.

Figure 9:
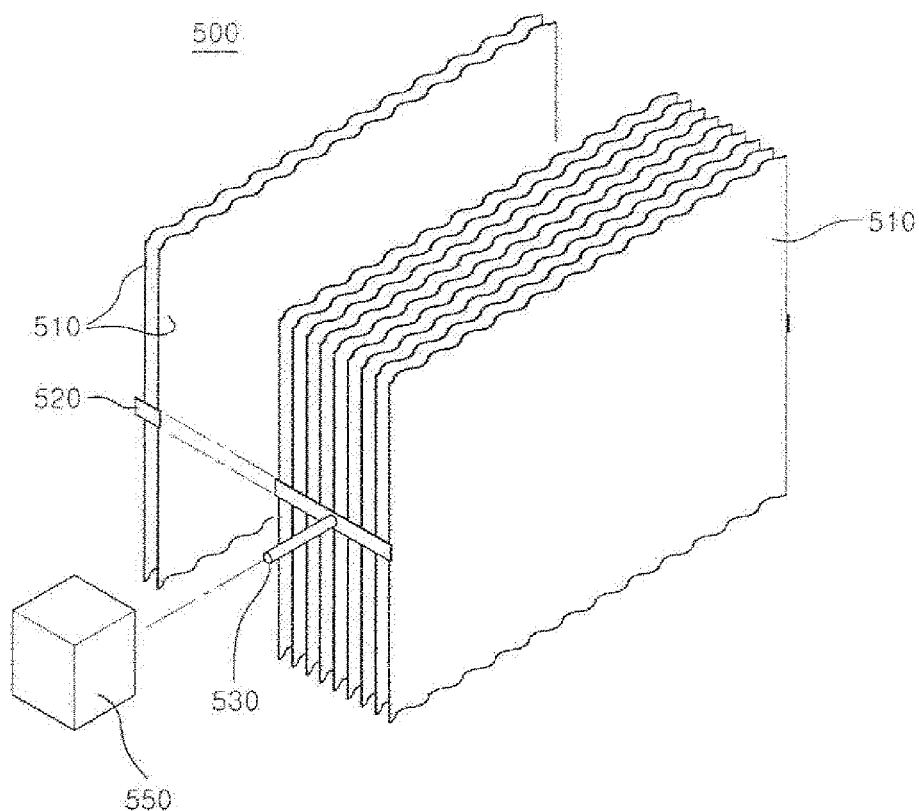
FIG. 9 is a perspective view illustrating a sloped plate unit, which is a substantial part of the apparatus for floating sludge in wastewater combined with a precipitation tank including sloped plates according to the present invention.

FIG. 9 is a perspective view illustrating a sloped plate unit, which is a substantial part of the apparatus for floating sludge in wastewater combined with a precipitation tank including sloped plates according to the present invention.

Figure 10:
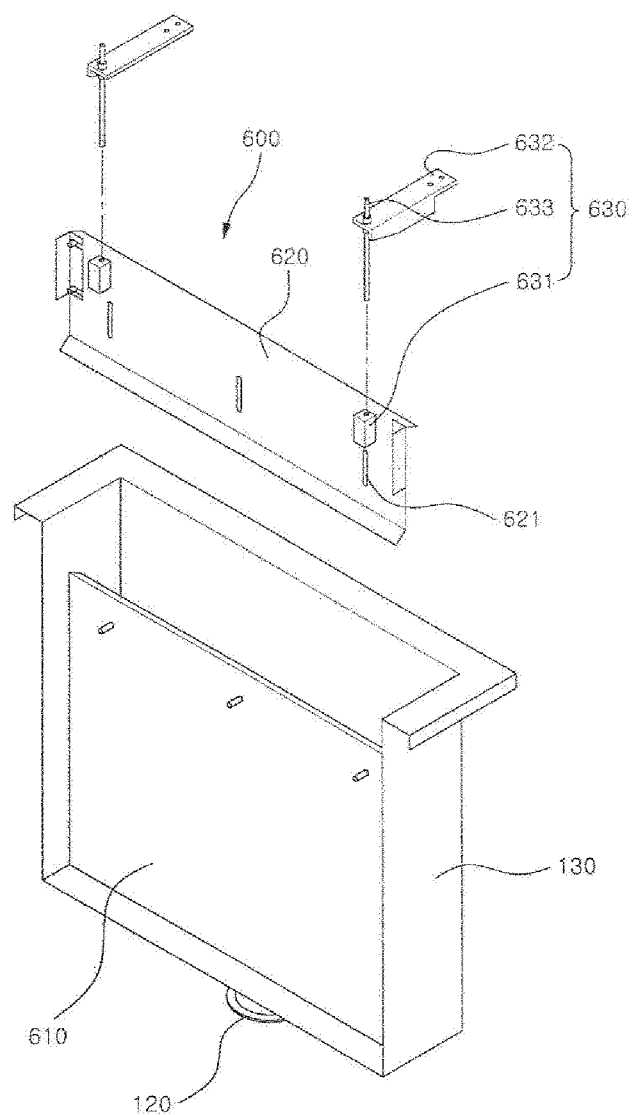
FIG. 10 is an exploded perspective view illustrating the structure of an elevation wall, which is a substantial part of the apparatus for floating sludge in wastewater combined with a precipitation tank including sloped plates according to the present invention.
Figure 11:
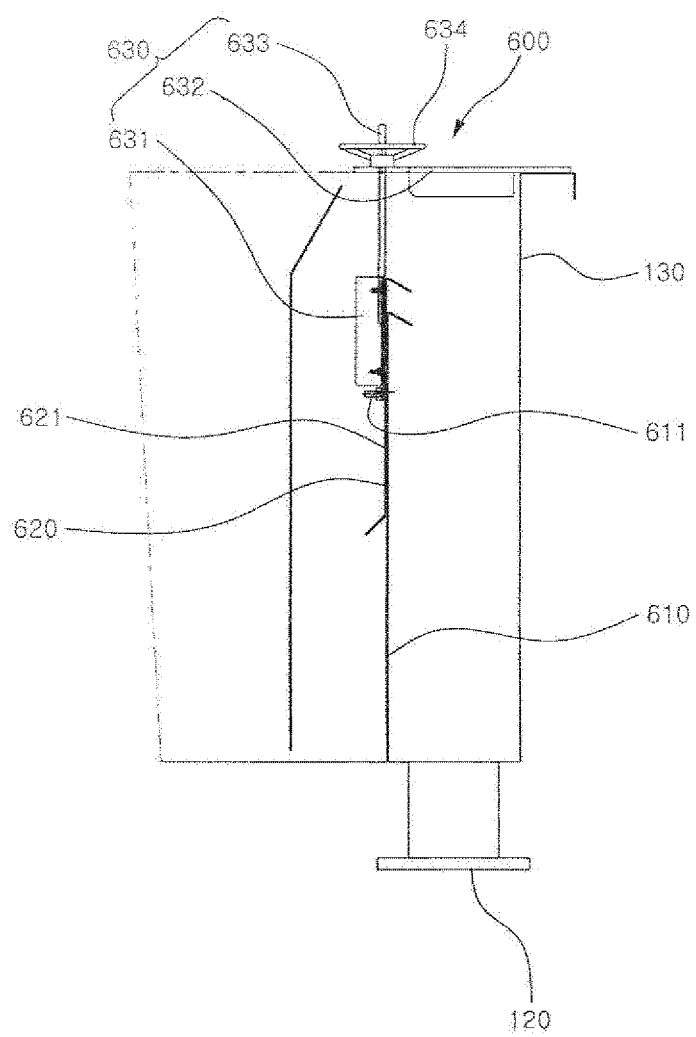
FIG. 11 is a schematic view illustrating the coupling structure of FIG. 10.

FIG. 10 is an exploded perspective view illustrating the structure of an elevation wall, which is a substantial part of the apparatus for floating sludge in wastewater combined with a precipitation tank including sloped plates according to the present invention. FIG. 11 is a schematic view illustrating the coupling structure of FIG. 10.

Figure 12:
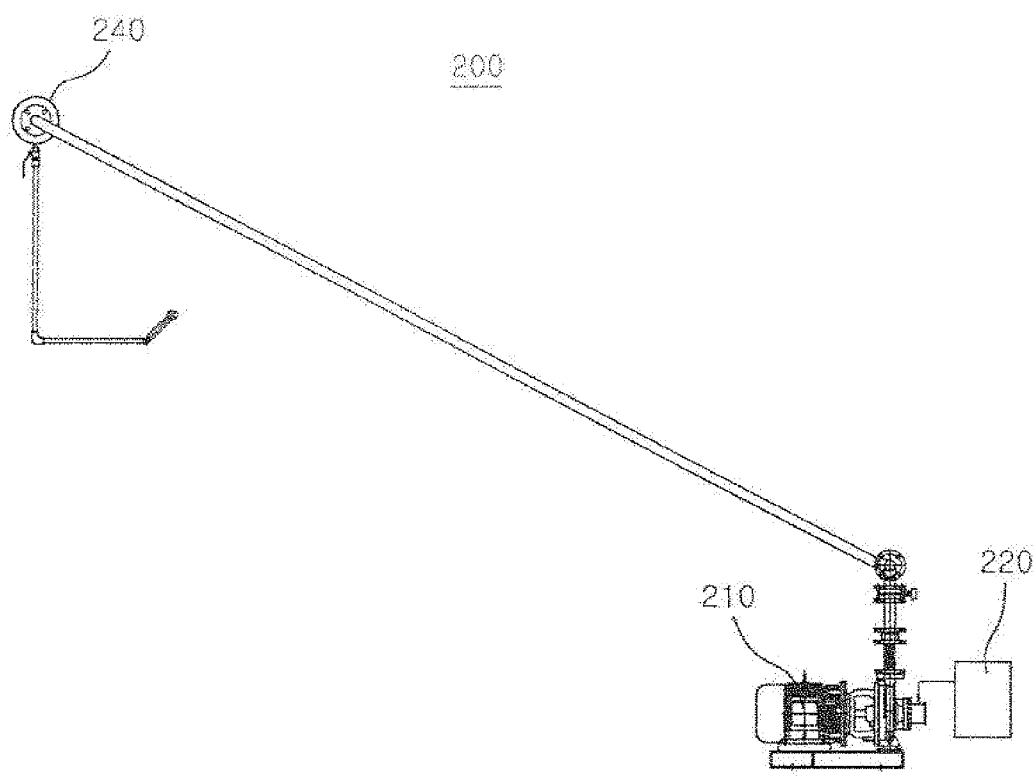
FIG. 12 is a front view illustrating the structure of a jetting and floating unit, which is a substantial part of the apparatus for floating sludge in wastewater combined with a precipitation tank including sloped plates according to the present invention.
Figure 13:
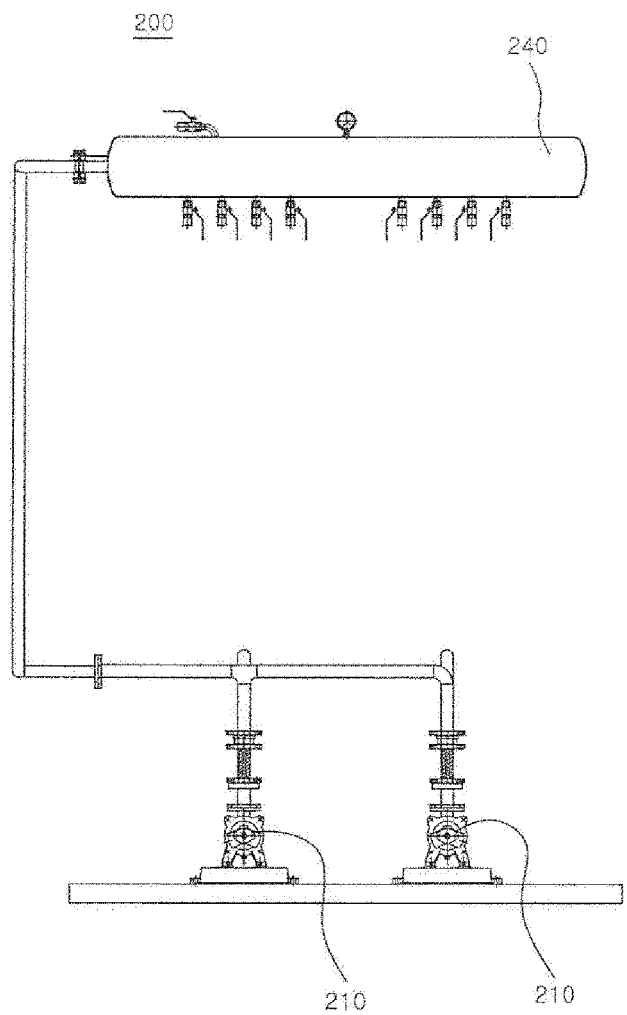
FIG. 13 is a side view illustrating the jetting and floating unit, which is a substantial part of the apparatus for floating sludge in wastewater combined with a precipitation tank including sloped plates according to the present invention.

FIG. 12 is a front view illustrating the structure of a jetting and floating unit, which is a substantial part of the apparatus for floating sludge in wastewater combined with a precipitation tank including sloped plates according to the present invention. FIG. 13 is a side view illustrating the jetting and floating unit, which is a substantial part of the apparatus for floating sludge in wastewater combined with a precipitation tank including sloped plates according to the present invention.

Figure 14:
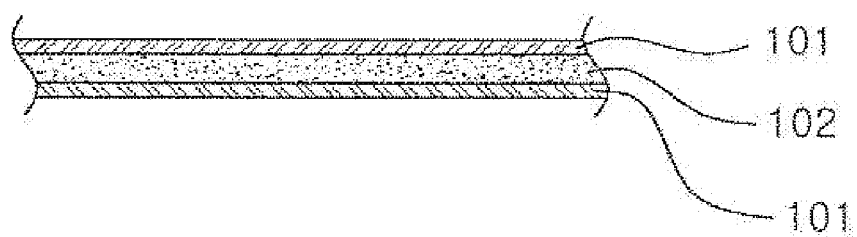
FIG. 14 is a cross-sectional view illustrating the sectional structure of a wall body of the precipitation and separation tank, which is a substantial part of an apparatus for floating sludge in wastewater combined with a precipitation tank including sloped plates according to another embodiment of the present invention.

FIG. 14 is a cross-sectional view illustrating the sectional structure of a wall body of the precipitation and separation tank, which is a substantial part of an apparatus for floating sludge in wastewater combined with a precipitation tank including sloped plates according to another embodiment of the present invention.

As illustrated in FIGS. 1 to 14, the apparatus for floating sludge in wastewater combined with a precipitation tank including sloped plates according to the preferred embodiment of the present invention, which is constructed so as to selectively precipitate or float sludge included in wastewater introduced thereinto to thus recover the precipitated or floating sludge, includes, broadly speaking, a setting and separation tank 100, a jetting and floating unit 200, a removal unit 300, a discharge unit 400, a sloped plate unit 500 and an elevation wall 600.

Specifically, the precipitation and separation tank 100 is provided with an introduction port 110 and a discharge port 120 such that wastewater is introduced into the precipitation and separation tank 100 through the introduction port 110, sludge included in the wastewater is selectively precipitated or floated and then recovered, and the wastewater, from which the sludge is removed and recovered, is discharged through the discharge port 120.

The precipitation and separation tank 100 is constructed so as to allow wastewater, which is positioned in the lower portion of the precipitation and separation tank 100, to be introduced into one end of a housing 130 through the pipe shown in FIGS. 7 and 8.

The lower portion of the precipitation and separation tank 100 is configured to have the form of a hopper having sloping surfaces at two sides thereof such that sludge having a higher specific gravity than wastewater is collected at the center of the bottom of the hopper.

Furthermore, the precipitation and separation tank 100 is provided with housings 130 so as to isolate the discharge port 120 from the removal unit 300, which will be described later, such that the wastewater that is located in the lower portion of the precipitation and separation tank 100 and is subjected to precipitation treatment is introduced thereinto through a lower portion of one side thereof and is discharged through the discharge port 120 at the other side thereof.

In other words, the wastewater, in which sludge is precipitated in the lower portion of the setting and separation tank 100 through the above-mentioned procedure, is introduced into one side of the housing 130 through the pipe shown in FIGS. 7 and 8.

The jetting and floating unit 200 is configured to selectively jet fine bubbles into the precipitation and separation tank 100 at a location close to the introduction port 110 in order to selectively float sludge included in the wastewater introduced into the precipitation and separation tank 100.

Specifically, the jetting and floating unit 200 includes a pump configured to suck and pump the wastewater in the precipitation and separation tank 100, an air compressor 220 configured to supply air to the wastewater introduced into the pump 210, a mixer (not shown) configured to mix the wastewater and the air supplied by the pump 210 in a pipe in order to create fine bubbles, and a chamber 240 configured to distribute the fine bubbles, created by the mixer (not shown), together with the wastewater into the precipitation and separation tank 100.

Although not illustrated in the drawings, the mixer (not shown) is preferably composed of a cylindrical case (not shown) coupled to the pipe, through which the wastewater is transferred, and a shaft (not shown), which is axially mounted in the case (not shown) and is provided on the outer surface thereof with a plurality of blades (not shown).

Furthermore, it is preferable that the case (not shown) be removably coupled to the pipe via front and rear flanges thereof.

The removal unit 300 is positioned above the precipitation and separation tank 100 so as to recover the sludge floating in the wastewater.

Specifically, the removal unit 300 is positioned above the precipitation and separation tank 100 so as to recover the sludge that is selectively floated by the jetting and floating unit 200.

The removal unit 300 includes a conveyor 310 positioned above the precipitation and separation tank 100, a scraper 320, which is coupled to the conveyor a regular intervals and is rotated in linkage with rotation of the conveyor 310 while scraping the floating sludge, a guide panel 330 configured to discharge the sludge, which is scraped by the scraper 320, to the outside of the precipitation and separation tank 100, and a floating sludge discharge port 340, which is formed at one end of the lower end of the guide panel 330 so as to communicate with the outside such that the sludge guided along the guide panel 330 is discharged to the outside of the precipitation and separation tank 100.

In other words, the removal unit 300 is operated in a manner such that the scraper 320 is moved in linkage with activation of the conveyor 310 while scraping sludge floating on the surface of wastewater and the scraped sludge is moved along the guide panel 330, falls at the end of the guide panel 330 and is discharged to the outside through the floating sludge discharge port 340, thereby being recovered.

The discharge unit 400 is provided at the lower portion of the precipitation and separation unit 100 so as to discharge precipitated sludge.

Particularly, the discharge unit 400 is preferably embodied as a discharge screw, which is provided at the lower portion of the precipitation and separation tank 100 and which is composed of a shaft 410, which is rotated by a motor and a reduction gear, and a screw blade 420, which is spirally wound around the shaft 410 in a longitudinal direction.

Specifically, it is critical to configure the screw blade 420 of the discharge screw, that is, the discharge unit 400, which is spirally wound around the shaft 410 in the longitudinal direction, such that the pressure load required to transfer the sludge precipitated in the lower portion of the precipitation and separation tank 100 toward one end thereof in a longitudinal direction is reduced.

Accordingly, it is more preferable that the discharge screw, which is provided as the discharge unit 400, be provided with transfer pressure control cuts, which are spaced apart from each other at regular intervals in the direction in which the screw blade is wound around the shaft 410.

The elevation wall 600 is provided in the housing 130, which is configured such that the wastewater, which is positioned in the lower portion of the precipitation and separation tank 100 and from which precipitated or floating sludge is recovered, is introduced through one end of the tank 100 and is discharged through the discharge port 120 in the other end of the tank 100 so as to isolate the discharge port 120 from the removal unit 300. By controlling the height of the elevation wall 600, the discharge level of the wastewater, from which sludge is recovered, is controlled.

Specifically, the elevation wall 600 includes a first wall body 610 fixedly mounted on the inner bottom of the housing 130, a second wall body 620 configured to be raised and lowered in the state of being in close contact with one surface of the first wall body 610, and a controller 630 connected to the second wall body 620 so as to control the height of the elevation wall 600.

It is preferable that the first wall body 610 be provided with a bolt 611, which projects in one direction therefrom and which is engaged with a nut, and that the second wall body 620 be provided therein with a long hole 621 so as to be raised and lowered in the state in which the bolt 611 is disposed in the long hole 621.

The controller 630 includes a nut block 631 mounted on one side of the upper portion of the first wall body 610, a bracket 632 mounted on the upper portion of the housing 130, and a shaft bolt 633, which rotatably extends through the bracket 632 and is engaged with the nut block 631.

Furthermore, the controller 630 preferably includes a handle 634 coupled to the upper end of the shaft bolt 633, which projects upwards from the bracket 632.

In the above-described elevation wall 600, the upper ends of the first and second wall bodies 610 and 620 may be bent.

Preferably, the apparatus for floating sludge in wastewater combined with a precipitation tank including sloped plates according to the present invention, which is constructed as described above, further includes a washing unit 700, configured to pneumatically wash the inside of the introduction port 110 and the upper and lower portions of the sloped plate unit 500.

The washing unit 700 includes an upper support pipe 710, a lower support pipe 720, and a booster compressor 740.

Specifically, the upper support pipe 710 is composed of a plurality of support pipes, which are disposed above the sloped plate unit 500 in the precipitation and separation tank 100 at regular intervals, and each of which is composed of a hollow pipe and has spray holes 711 formed through the lower portion thereof at regular intervals.

Meanwhile, the lower support pipe 720 is composed of a plurality of support pipes, which are disposed under the sloped plate unit 500 at regular intervals and each of which is composed of a hollow pipe and has spray holes 721 formed through the upper portion thereof at regular intervals.

An air compressor 730 is disposed outside the introduction port 110 of the precipitation and separation tank 100 so as to generate compressed air.

The booster compressor 740 is connected to the air compressor 730 so as to boost the pressure of the compressed air and to selectively supply the compressed air having the boosted pressure to at least one of the inside of the introduction port 110, the spray holes 711 in the upper support pipes 710, and the spray holes 721 in the lower support pipes 720.

The boost compressor 740 includes a cylindrical stator 741, which is made of synthetic rubber and has a spiral compression chamber 741*a* formed therethrough, a rotor 742, which has a spiral protrusion formed on the outer surface thereof and is rotatably fitted into the spiral compression chamber 741*a* in the cylindrical stator 741, and a cylindrical sleeve 743, coupled to the outer surface of the cylindrical stator 741.

Preferably, the boost compressor 740, which is constructed as described above, generates compressed air having a boosted pressure when the rotor 742 rotates, and supplies the compressed air to the inside of the introduction port 110 and the upper and lower sides of the sloped plate unit 500 through the spray holes 711 in the upper support pipes 710 and the spray holes 721 in the lower support pipes 720.

In the apparatus for floating sludge in wastewater combined with a precipitation tank including sloped plates according to the present invention, which is constructed as described above, the sloped plate unit 500 is provided in the precipitation and separation tank 100 so as to stabilize the flow of wastewater using the fine bubbles supplied from the jetting and floating unit 200 to thus selectively precipitate sludge downwards.

Referring to FIG. 9, the sloped plate unit 500 preferably includes a plurality of sloped plates 510, which are arranged at the upper side of the inside of the precipitation and separation tank 100 at regular intervals, a holding bar 520, which is in close contact with side portions of the sloped plates 510 so as to hold the adjacent sloped plates 510 to each other, a rotating shaft 530 projecting from the center of the holding bar 520, and a control box 550, which is connected to the rotating shaft 530 and performs control to rotate the rotating shaft 530 to a predetermined angle to thus selectively rotate the sloped plates 510 to the predetermined angle.

Each of the sloped plates 510 is preferably corrugated in a horizontal direction so as to have convex portions and concave portions, which are alternately and repeatedly arranged. In this case, because the flow of wastewater through the concave portions between a pair of sloped plates 510 is very weak or does not occur, sludge flowing through the space between the two sloped plates 510 is trapped in the concave portions and is precipitated toward the bottom of the precipitation and separation tank 100.

Furthermore, because the flow of wastewater in the concave portions between the sloped plates 510 in the precipitation and separation tank 100 does not occur when the operation of the jetting and floating unit 200 is halted, sludge flowing between the sloped plates 510 is more stably precipitated toward the bottom of the precipitation and separation tank 100. Particularly, because the sloped plates 510 are selectively rotated and inclined to a predetermined angle under the control of the control box 550, it is possible to maximize the efficiency with which the sludge is precipitated toward the bottom of the precipitation and separation tank 100.

In other words, by selectively halting the operation of the jetting and floating unit 200, it is possible to more stably use the precipitation and separation tank 100 as a precipitation tank.

In the apparatus for floating sludge in wastewater combined with a precipitation tank including sloped plates according to the present invention, which is constructed as described above, the wall body of the precipitation and separation tank 100 may be configured to have an insulating structure.

To this end, the wall body of the precipitation and separation tank 100 is configured to have a multi-layered structure in which an insulation block 102 is interposed between a pair of main plates 101.

Here, the insulation block 102 is preferably manufactured through a process composed of a material preparation operation of mixing 50 wt % bottom ash, 10 wt % fly ash, 5 wt % glass beads, 15 wt % clay ash, 10 wt % graphite ash, 5 wt % sodium silicate, and 5 wt % auxiliary additive to prepare an insulation material and preparing a zigzag-shaped reinforcing plate (not shown), a forming operation of disposing the reinforcing plate (not shown) at the center of a mold, injecting the insulation material into the mold and pressing the insulation material including the reinforcing plate using a press to form a bar-shaped block, a drying operation of drying the formed block at 80-450° C. for 25 minutes while passing the formed block through a drying furnace, a baking operation of baking the dried block in a baking furnace at 900-1300° C. for 35 minutes, and a cooling operation of cooling the baked block in a nitrogen atmosphere for 10 minutes.

Here, although not specifically illustrated in the drawings, the reinforcing plate (not shown) is disposed at the center of the insulation block 102 in the thickness direction.

In the material preparation operation of the process of manufacturing the insulation block 102, it is more preferable that the 50 wt % bottom ash having a particle size of 0.3 mm-5 mm be mixed such that the particle size distribution of the bottom ash is composed of 10 wt % of 4.7-5 mm, 40 wt % of 4.75-2.36 mm, 30 wt % of 2.36-1.18 mm, 10 wt % of 1.18-0.6 mm and 10 wt % of 0.6-0.3 mm, based on a total of 100 wt % of bottom ash.

Since the apparatus for floating sludge in wastewater combined with a precipitation tank including sloped plates according to the present invention, which is constructed as described above, includes the discharge unit, which is embodied as the discharge screw having the transfer pressure control cuts, which are formed in the screw blade, which is wound around the shaft at regular intervals in a spiral direction, it is possible to optimize the efficiency with which sludge is discharged, by reducing the transfer load required to discharge the sludge by virtue of the discharge screw.

Furthermore, since the apparatus is provided with the washing unit, it is possible to easily wash and manage the sloped plate unit in the precipitation and separation tank when the sloped plate unit is required to be washed.

In addition, since the wall body of the precipitation and separation tank is improved so as to realize an insulating structure, it is possible to maximize the efficiency of insulation of the apparatus.

Furthermore, according to the present invention, it is possible to selectively precipitate or float sludge in the precipitation and separation tank to which fine bubbles are supplied while controlling the discharge level of wastewater from which the sludge is recovered through the precipitation or the floatation. In addition, since the sloped plate unit is configured to be selectively rotatable so as to be inclined at a predetermined angle relative to the vertical position, it is possible to selectively use the precipitation and separation tank only as a precipitation tank by blocking the supply of fine bubbles to the inside of the precipitation and separation tank, and it is possible to maximize the efficiency of precipitation by guiding the sludge in the vertical direction or in the inclined direction.

Although the preferred embodiment of the present invention has been described in detail, the present invention is not limited thereto. Various modifications of the present invention are possible by those skilled in the art to which the present invention belongs, and these modifications should be construed as falling within the scope of the present invention.

The invention claimed is:

1. An apparatus for floating sludge in wastewater combined with a precipitation tank including sloped plates, which is constructed to selectively precipitate or float sludge included in wastewater introduced thereinto to thus recover the sludge, the apparatus comprising:
   a precipitation and separation tank including an introduction port and a discharge port such that wastewater introduced into the apparatus through the introduction port and wastewater from which the precipitated or floating sludge is recovered is discharged through the discharge port;
   a jetting and floating unit, which is disposed adjacent to the introduction port so as to selectively jet fine bubbles into the precipitation and separation tank and to selectively float the sludge included in wastewater introduced into the precipitation and separation tank;
   a removal unit, which is disposed above the precipitation and separation tank so as to recover the sludge floated in the wastewater;
   a discharge unit embodied as a discharge screw, which is disposed at a lower portion of the precipitation and separation tank and which is composed of a shaft, which is rotated by a motor and a reduction gear, and a screw blade spirally wound around the shaft in a longitudinal direction so as to discharge the precipitated sludge;
   a sloped plate unit, which is disposed in the precipitation and separation tank so as to stabilize introduction of the wastewater through the introduction port and flow of the wastewater by the fine bubbles supplied from the jetting and floating unit to thus selectively precipitate the sludge downwards;
   an elevation wall, which is disposed so as to isolate the discharge port from the removal unit and which is disposed in a housing so as to control a discharge level of the wastewater, from which the sludge is recovered, by controlling the height thereof, the housing being configured such that the wastewater, from which lower precipitated sludge or upper floating sludge in the precipitation and separation tank is recovered, is introduced through a portion of a lower portion thereof and is then discharged through the discharge port formed in another portion thereof;
   the screw blade of the discharge screw serving as the discharge unit having transfer pressure cuts formed therein in a direction in which the screw blade is spirally wound around the shaft, in order to reduce a transfer load required to transfer sludge precipitated in the lower portion of the precipitation and separation tank toward one side of the precipitation and separation tank in a longitudinal direction; and
   a washing unit configured to pneumatically perform washing of an inside of the introduction port and upper and lower sides of the sloped plate unit,
   wherein the washing unit includes an upper support pipe having a hollow pipe structure, which is disposed above the sloped plate unit in the precipitation and separation tank and has spray holes formed through a lower portion thereof at regular intervals, a lower support pipe having a hollow pipe structure, which is disposed under the sloped plate unit and which has spray holes formed through an upper portion thereof at regular intervals, an air compressor disposed outside of the introduction port of the precipitation and separation tank so as to generate compressed air, and a booster compressor, which is connected to the air compressor so as to boost a pressure of the compressed air to thus create compressed air having a boosted pressure and which selectively supplies the compressed air having the boosted pressure to at least one of the inside of the introduction port, the spray holes in the upper support pipe, and the spray holes in the lower support pipe.

2. The apparatus according to claim 1, wherein the booster compressor includes a cylindrical stator, which is made of synthetic rubber and has a spiral compression chamber formed therethrough, a rotor, which has a spiral protrusion formed on an outer surface thereof and is rotatably fitted into the spiral compression chamber in the cylindrical stator, and a cylindrical sleeve coupled on an outer surface of the cylindrical stator, and
   wherein, when the rotator rotates, the booster compressor generates compressed air having a boosted pressure and supplies the compressed air to the inside of the introduction port and the upper and lower sides of the sloped plate unit through the spray holes in the upper support pipe and the spray holes in the lower support pipe.

* * * * *